US012750437B2

(12) United States Patent
Gao et al.

(10) Patent No.: US 12,750,437 B2
(45) Date of Patent: Sep. 29, 2026

(54) DAMPING MECHANISM AND TERMINAL

(71) Applicant: Honor Device Co., Ltd., Shenzhen (CN)

(72) Inventors: Mingqian Gao, Shenzhen (CN); Yaolei Zhang, Shenzhen (CN); Yameng Wei, Shenzhen (CN); Lei Feng, Shenzhen (CN); Haifei Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 377 days.

(21) Appl. No.: 18/561,131

(22) PCT Filed: Apr. 27, 2023

(86) PCT No.: PCT/CN2023/091145
§ 371 (c)(1),
(2) Date: Nov. 15, 2023

(87) PCT Pub. No.: WO2024/012008
PCT Pub. Date: Jan. 18, 2024

(65) Prior Publication Data

US 2024/0236217 A1 Jul. 11, 2024

(30) Foreign Application Priority Data

Jul. 12, 2022 (CN) ......................... 202210815943.4

(51) Int. Cl.
*H04B 1/38* (2015.01)
*F16C 11/12* (2006.01)
*H04M 1/02* (2006.01)

(52) U.S. Cl.
CPC ............ *H04M 1/022* (2013.01); *F16C 11/12* (2013.01); *H04M 1/0237* (2013.01)

(58) Field of Classification Search
CPC .... H04M 1/022; H04M 1/0206; H04M 1/021; H04M 1/0212; H04M 1/0214;
(Continued)

(56) References Cited

U.S. PATENT DOCUMENTS 6,460,221 B1 10/2002 Eromäki
7,219,393 B2 5/2007 Kida
(Continued)

FOREIGN PATENT DOCUMENTS

CN 1764359 A 4/2006
CN 1916434 A 2/2007
(Continued)

OTHER PUBLICATIONS

Springs & Things Incorporated, "Torsion Springs", Handbook of Spring Design, Spring Manufacturers Institute, Jan. 1, 2002, 4 pages.
(Continued)

*Primary Examiner* — Tuan Pham
(74) *Attorney, Agent, or Firm* — Slater Matsil, LLP

(57) ABSTRACT

This application provides a damping mechanism. An elastic member, where the elastic member includes a first pin and a second pin; a first fixing member, where the first fixing member is rotatably connected to the second pin in a first direction; and a first swinging member, where the first swinging member includes a first fixing portion and a first moving portion connected to the first fixing portion, and the first fixing portion is rotatably connected to the first fixing member in the first direction; the first moving portion is rotatably connected to the first pin in the first direction; and when rotation is performed between the first fixing member and the first swinging member, an elastic force generated by the elastic member acts on a center of rotation in which the
(Continued)

first moving portion is rotatably connected to the first pin, forming an unfolding force or a closing force.

20 Claims, 9 Drawing Sheets

(58) Field of Classification Search
CPC ............. H04M 1/0216; H04M 1/0222; H04M 1/0227; F16C 11/12
See application file for complete search history.

(56) References Cited

U.S. PATENT DOCUMENTS

| | | | |
|---|---|---|---|
| 8,744,070 | B2 | 6/2014 | Zhang et al. |
| 10,241,540 | B2 | 3/2019 | Chuang et al. |
| 12,066,872 | B2 * | 8/2024 | Kim .......................... G06F 1/16 |
| 2004/0085738 | A1 | 5/2004 | Barth |
| 2007/0039135 | A1 | 2/2007 | Duan et al. |
| 2008/0118057 | A1 | 5/2008 | Son et al. |
| 2021/0223826 | A1 * | 7/2021 | Ye ......................... H04M 1/022 |
| 2022/0261040 | A1 | 8/2022 | Liu et al. |
| 2022/0321685 | A1 | 10/2022 | Park et al. |
| 2023/0244274 | A1 | 8/2023 | Lin et al. |

FOREIGN PATENT DOCUMENTS

| | | | |
|---|---|---|---|
| CN | 201096141 | Y | 8/2008 |
| CN | 101382823 | A | 3/2009 |
| CN | 101951745 | A | 1/2011 |
| CN | 102339100 | A | 2/2012 |
| CN | 206299255 | U | 7/2017 |
| CN | 108628394 | A | 10/2018 |
| CN | 209265333 | U | 8/2019 |
| CN | 110442196 | A | 11/2019 |
| CN | 110769108 | A | 2/2020 |
| CN | 110805610 | A | 2/2020 |
| CN | 111810522 | A | 10/2020 |
| CN | 111997991 | A | 11/2020 |
| CN | 113833741 | A | 12/2021 |
| CN | 114063706 | A | 2/2022 |
| CN | 114203028 | A | 3/2022 |
| CN | 114333566 | A | 4/2022 |
| CN | 114688147 | A | 7/2022 |
| CN | 114697418 | A | 7/2022 |
| CN | 114893494 | A | 8/2022 |
| EP | 1107091 | A2 | 6/2001 |
| JP | 2000192939 | A | 7/2000 |
| JP | 2003239943 | A | 8/2003 |
| JP | 2005108201 | A | 4/2005 |
| JP | 2009299861 | A | 12/2009 |
| WO | 2017219630 | A1 | 12/2017 |
| WO | 2020246811 | A1 | 12/2020 |

OTHER PUBLICATIONS

Anonymous, "The Essential Guide to Spring Technology", SpringTech, https://www.springs.co.uk/wp-content/uploads/2017/07/Essential-Guide-to-Spring-Technology-2017.pdf, Jul. 31, 2017, 32 pages.

Wu Xiao et al.; "Affine-invariante Image Matching for Automatic Object Recognition Using Mobile Phone Cameras" (with English abstract); Computer Measurement & Control; Feb. 25, 2012; 3 pages.

* cited by examiner

DAMPING MECHANISM AND TERMINAL

CROSS-REFERENCE TO RELATED APPLICATIONS

This application is a national stage of International Application No. PCT/CN2023/091145 filed on Apr. 27, 2023, which claims priority to Chinese Patent Application No. 202210815943.4 filed on Jul. 12, 2022. The disclosures of both of the aforementioned applications are hereby incorporated by reference in their entireties.

TECHNICAL FIELD

This application relates to the field of communication technologies, and in particular, to a damping mechanism of a rotating shaft in a foldable display terminal and a terminal.

BACKGROUND

As a foldable display terminal emerges, a requirement for a light and thin size structure of a foldable screen is increasing gradually. A light and thin size of a foldable screen phone brings better user experience. That the foldable screen phone has a folding effect is usually due to a rotating shaft with a damping function in the foldable screen phone. However, an existing rotating shaft damping mechanism has a relatively large structure size. The existing rotating shaft damping mechanism is mounted on the rotating shaft, and consequently the rotating shaft cannot be used in a lighter and thinner foldable machine. In order not to affect a folding hand feel of a user, a damping mechanism with a small size and occupying small space is urgently required.

SUMMARY

This application provides a damping mechanism and a terminal, to adapt to a foldable screen phone with a light and thin size, and provide a required unfolding force and closing force.

According to a first aspect, this application provides a damping mechanism, including: an elastic member, where the elastic member includes a first pin and a second pin; a first fixing member, where the first fixing member is rotatably connected to the second pin in a first direction; and a first swinging member, where the first swinging member includes a first fixing portion and a first moving portion, and the first fixing portion is rotatably connected to the first fixing member in the first direction; the first moving portion is rotatably connected to the first pin in the first direction; and when rotation is performed between the first fixing member and the first swinging member, an elastic force generated by the elastic member acts on a center of rotation in which the first moving portion is rotatably connected to the first pin, forming an unfolding force or a closing force.

For example, at least one first swinging member in the damping mechanism in this application is disposed. For example, the elastic member in this application may be a torsion spring, a spring, or the like. For example, a quantity of elastic members is not limited in this embodiment of this application. Based on the foregoing structure, for example, the first fixing member may be an independent structure located between a first housing and a second housing, or the first fixing member may be integrated with the first housing, or the first fixing member may be integrated with the second housing. For example, the first fixing member is the independent structure. For example, there may be a plurality of first swinging members, and the plurality of first swinging members are disposed on a same side of the first fixing member. For example, the plurality of first swinging members are fixedly connected to the first housing. When an included angle between each first swinging member and the first fixing member is 90°-180°, a foldable screen phone may be in an unfolded state. In this case, a torque force generated by a torsion foot of the torsion spring resolves an unfolding force and a folding force, and the unfolding force is greater than the folding force. When an included angle between each first swinging member and the first fixing member is 90°, a torque force generated by the torsion foot of the torsion spring resolves an unfolding force and a folding force that are balanced. When an included angle between each first swinging member and the first fixing member is 0°-90°, a torque force generated by the torsion foot of the torsion spring resolves an unfolding force and a folding force, and the unfolding force is less than the folding force. Therefore, opening and closing between the first swinging member and the first fixing member are implemented, to further drive opening and closing between the first housing and the second housing. In addition, the torsion spring is used to bring a damping effect of the torque force. Due to a small size of the torsion spring, it is easy to mount and remove the torsion spring. In addition, the torsion spring does not need to be directly connected to a rotating shaft, so that there is a low requirement on a structure size of the rotating shaft. For example, shapes and sizes of the first fixing member and the first swinging member are not limited in this application, provided that a rotatable connection to the torsion spring, namely, limiting, can be implemented. In some possible implementations, a center of rotation in which the first fixing member is rotatably connected to the first fixing portion is a first center of rotation, a center of rotation in which the second pin is rotatably connected to the first fixing member is a second center of rotation, and a projection of the first center of rotation on a reference plane does not overlap a projection of the second center of rotation on the reference plane. The reference plane is a plane perpendicular to the first direction. Such arrangement can ensure that the center of rotation in which the first pin is rotatably connected to the first moving portion is not located on an extended line connecting the projection of the first center of rotation on the reference plane and the projection of the second center of rotation on the reference plane, thereby generating an unfolding force or a closing force.

In some possible implementations, a center of rotation in which the first pin is rotatably connected to the first moving portion is a third center of rotation; and when the first fixing member and the first swinging member are at a first preset included angle, and a projection of the third center of rotation on the reference plane is located on an extended line connecting the projection of the first center of rotation on the reference plane and the projection of the second center of rotation on the reference plane, there is no unfolding force or closing force on the third center of rotation; or when the first fixing member and the first swinging member are at a second preset angle, the third center of rotation is not located on the extended line connecting the projection of the first center of rotation on the reference plane and the projection of the second center of rotation on the reference plane, for example, the third center of rotation is located above or below the extended line connecting the projection of the first center of rotation on the reference plane and the projection of the second center of rotation on the reference plane, to form an unfolding force or a closing force acting on the third center of rotation, for example, to assist the foldable mobile phone in unfolding or closing.

For example, the first preset angle is not specifically limited in this application. The first preset angle may be 80°, 90°, 100°, 120°, 140°, 160°, or the like.

For example, the second preset angle is not specifically limited in this application. The second preset angle may be 180°, 150°, 60°, 50°, or the like.

In some possible implementations, the damping mechanism further includes a limiting slider assembly, and an accommodating groove used to accommodate the limiting slider assembly is provided on a side surface of the first swinging member in a second direction; the first pin is rotatably connected to the limiting slider assembly in the first direction; the limiting slider assembly is slidably connected to the accommodating groove in the second direction, to drive the first pin to move in the second direction; and the second direction is perpendicular to the first direction.

Specifically, at some angles, the elastic member is in a free state, and generates no elastic force. For example, the elastic member may be a spring. In a free state, the spring is not compressed or stretched. This is beneficial to a service life of the elastic member (the spring, the torsion spring, or the like).

In some possible implementations, the limiting slider assembly includes a first slider with a first sliding groove and a limiting member that relatively moves in the second direction in the first sliding groove; the limiting member is capable of passing through the accommodating groove and being fixed to the first swinging member; and the first sliding groove includes a closed annular surface, the annular surface includes, in the second direction, a first point and a second point disposed farthest from the first point, and the limiting member moves between the first point and the second point; and when an included angle between the first swinging member and the first fixing member is a third preset included angle, the limiting member abuts against the first point; or when the included angle between the first swinging member and the first fixing member changes from the third preset included angle to a fourth preset included angle, the limiting member moves from the first point to the second point. For example, when the included angle between the first swinging member and the first fixing member is the fourth preset included angle, the limiting member may be in contact with the second point.

For example, the limiting member can move in the first sliding groove, that is, move from the first point to the second point, so that the first slider can slide in the accommodating groove, and the first pin is in a free state, that is, the elastic member is in a free state, which can improve a service life of the elastic member.

For example, the third preset included angle and the fourth preset angle are not limited in this application. For example, the third preset included angle may be the same as or may be different from the first preset angle or the second preset angle. The fourth preset included angle may be the same as or may be different from the first preset angle or the second preset angle.

In some possible implementations, a clamping groove is provided on a surface of the first slider in contact with the torsion spring, and the clamping groove is used to limit a mounting location of a center of rotation of the first pin. The clamping groove used to limit the first pin is provided on the first slider, which can reduce a structural component, and can further implement a connection to the first pin.

In some possible implementations, the clamping groove includes a first inner side wall, an inner top surface, and a second inner side wall that are smoothly connected to each other, the inner top surface is used to limit displacement of the first pin in the second direction, and the first inner side wall and the second inner side wall are used to limit displacement of the first pin in the first direction.

For example, a distance between the first inner side wall and the second inner side wall is adapted to a size of the first pin, so that the first pin does not shift in the second direction or the first direction at this location, thereby ensuring stability of a rotatable connection of the first pin relative to the first slider.

In some possible implementations, the limiting slider assembly further includes a locking member, a locking boss is disposed on the surface of the first slider in contact with the torsion spring, a locking hole adapted to the locking member is provided on the locking boss in the second direction, the locking boss is located above the inner top surface, and a lower edge surface of the locking boss, the inner top surface, and the locking member all are formed to limit displacement of the first pin in the second direction.

For example, the locking boss can be adapted to the clamping groove, and is configured to limit the displacement of the first pin in the second direction and the first direction, to ensure stability of a rotatable connection of the first pin relative to the first slider.

In some possible implementations, the first fixing portion includes a protruding sliding rail sub-portion that protrudes downward in a third direction, and a sliding groove sub-portion adapted to the protruding portion is disposed on the first fixing member; and the sliding groove sub-portion is located below the protruding portion, is fixedly disposed relative to the protruding sliding rail sub-portion in the third direction and a second direction, and is rotatably connected to the protruding sliding rail sub-portion in the first direction.

For example, the protruding sliding rail sub-portion in this application is slidably connected to the sliding groove sub-portion. Whether the protruding sliding rail sub-portion is disposed on the first fixing portion is not limited in this application, and whether the sliding groove sub-portion is disposed on the first fixing member is not limited in this application, provided that a slidable connection between the first fixing portion and the first fixing member can be implemented.

In some possible implementations, the first fixing portion includes a protruding sliding rail sub-portion that protrudes downward in a third direction, and a sliding groove sub-portion adapted to the protruding portion is disposed on the first fixing member; and the sliding groove sub-portion is located above the protruding portion, is fixedly disposed relative to the protruding sliding rail sub-portion in the third direction and a second direction, and is rotatably connected to the protruding sliding rail sub-portion in the first direction.

For example, the protruding sliding rail sub-portion in this application is slidably connected to the sliding groove sub-portion. Whether the protruding sliding rail sub-portion is disposed on the first fixing portion is not limited in this application, and whether the sliding groove sub-portion is disposed on the first fixing member is not limited in this application, provided that a slidable connection between the first fixing portion and the first fixing member can be implemented.

In some possible implementations, the first fixing portion includes a protruding sliding rail sub-portion that protrudes upward in a third direction, and a sliding groove sub-portion adapted to the protruding sliding rail sub-portion is disposed on the first fixing member; and the sliding groove sub-portion is located above the protruding portion, is fixedly disposed relative to the protruding sliding rail sub-portion in the third direction and a second direction, and is rotatably connected to the protruding sliding rail sub-portion in the first direction.

For example, the protruding sliding rail sub-portion in this application is slidably connected to the sliding groove sub-portion. Whether the protruding sliding rail sub-portion is disposed on the first fixing portion is not limited in this application, and whether the sliding groove sub-portion is disposed on the first fixing member is not limited in this application, provided that a slidable connection between the first fixing portion and the first fixing member can be implemented.

In some possible implementations, the first fixing portion includes a protruding sliding rail sub-portion that protrudes upward in a third direction, and a sliding groove sub-portion adapted to the protruding sliding rail sub-portion is disposed on the first fixing member; and the sliding groove sub-portion is located below the protruding portion, is fixedly disposed relative to the protruding sliding rail sub-portion in the third direction and a second direction, and is rotatably connected to the protruding sliding rail sub-portion in the first direction.

For example, the protruding sliding rail sub-portion in this application is slidably connected to the sliding groove sub-portion. Whether the protruding sliding rail sub-portion is disposed on the first fixing portion is not limited in this application, and whether the sliding groove sub-portion is disposed on the first fixing member is not limited in this application, provided that a slidable connection between the first fixing portion and the first fixing member can be implemented.

In some possible implementations, the first fixing member includes a base and a cover plate, the cover plate is located above the base, the second pin, and the first fixing portion, and the cover plate is fixedly connected to the base; the base includes the sliding groove sub-portion; and a mounting hole is provided on an edge of the cover plate in the first direction, and the second pin is rotatably connected to the mounting hole.

For example, the first fixing member in this application may include only a base, or may include a base and a cover plate. When the first fixing member includes a base and a cover plate, the base and the cover plate may be an integral structure, or may be detachable structures. When the base and the cover plate are detachable structures, the cover plate may have the foregoing mounting structure, so that the second pin of the torsion spring can be rotatably connected to the cover plate. Therefore, rotation of the torsion spring relative to the base is implemented.

In some possible implementations, the first fixing member includes a base, the base includes the sliding groove sub-portion, a mounting hole is provided on an edge of the base in the first direction, and the second pin is rotatably connected to the mounting hole.

For example, the first fixing member in this application may include only a structure of a base, and the sliding groove sub-portion is disposed on the base, to be slidably connected to the first swinging member. In addition, the base may be rotatably connected to the second pin through shaft hole cooperation.

In some possible implementations, the elastic member includes a flexible elastic member such as a torsion spring or a spring. A type of the elastic member is not limited in this embodiment of this application.

For example, the elastic member in this application may be a torsion spring, or may be a spring, and provided that a pull force or a compression force can be formed between two ends of the elastic member, a damping effect on the rotating shaft can be implemented.

According to a second aspect, this application provides a terminal, including the foregoing damping mechanism.

In some possible implementations, the terminal provided in this application further includes a first housing, a second housing, and a rotating shaft assembly located between the first housing and the second housing. The terminal further includes the foregoing damping mechanism, the damping mechanism is located on the outer side of the rotating shaft assembly, and at least one damping mechanism is disposed. The first swinging member is fixedly connected to the first housing, or the first swinging member is fixedly connected to the second housing. The first fixing member is located between the first housing and the second housing; or the first fixing member and the first housing are an integral structure; or the first fixing member and the second housing are an integral structure. This can implement all effects of the foregoing damping mechanism.

For example, the first swinging member may be fixed to a housing (the first housing or the second housing), or may be movably connected. A first pin may be connected to the first swinging member, or may be connected to a housing (the first housing or the second housing).

REFERENCE NUMERALS

Figure 1:
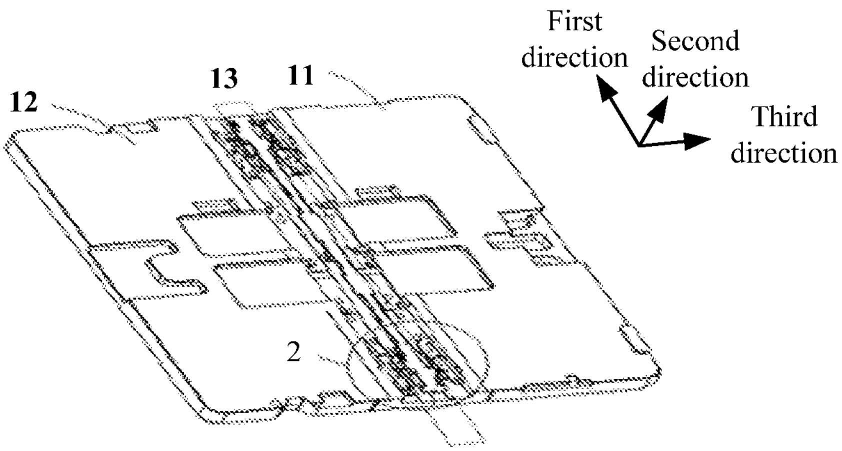
FIG. 1 is an example diagram of an application scenario of a foldable screen phone according to this application.

1—foldable screen phone; 11—first housing; 12—second housing; 13—rotating shaft;

2—damping mechanism; 21—first swing arm; 211—first fixing portion; 2111—protruding sliding rail sub-portion; 212—first moving portion; 2121—accommodating groove;

22—base; 221—sliding groove sub-portion; 23—limiting slider assembly; 231—first slider; 2311—first sliding groove; 2312—clamping groove; 2313—locking hole; 2314—locking boss; 2315—first inner side wall; 2316—inner top surface; 2317—second inner side wall; A1—first point; A2—second point; 232—limiting member; 233—locking member; 24—torsion spring; 241—first pin; 242—second pin; 25—cover plate.

DETAILED DESCRIPTION OF ILLUSTRATIVE EMBODIMENTS

To make the objectives, technical solutions, and advantages of this application clearer, the following clearly describes the technical solutions in this application with reference to the accompanying drawings in this application. It is clear that the described embodiments are merely some rather than all of embodiments of this application. All other embodiments obtained by a person of ordinary skill in the art based on the embodiments of this application without creative efforts shall fall within the protection scope of this application.

Terms such as "first" and "second" in the specification embodiments, claims, and accompanying drawings of this application are merely used for distinguishing descriptions, and cannot be understood as an indication or implication of relative importance, or an indication or implication of a sequence. The term "and/or" is used for describing an association between associated objects and representing that three associations may exist. For example, "A and/or B" may indicate that only A exists, only B exists, and both A and B exist, where A and B may be singular or plural. The character "/" usually indicates an "or" relationship between associated objects. Terms such as "mount", "connection", and "connected to" should be comprehended in a broad sense. For example, the connection may be comprehended as being fixedly connected, detachably connected, or integrally connected; or directly connected or indirectly connected by using an intermediate medium, or in an internal communication between two elements. In addition, the terms "include", "have", and any variation thereof are intended to cover non-exclusive inclusions. For example, a method, a system, a product, or a device that includes a series of steps or units is not necessarily limited to those steps or units that are clearly listed, but may include other steps or units that are not clearly listed or are inherent to the process, method, product, or device. Terms such as "upper", "lower", "left", and "right" are used only relative to orientations of components in the accompanying drawings. These directional terms are relative concepts, are used in relative description and clarification, and may correspondingly change based on changes in the placed orientations of the components in the accompanying drawings.

An embodiment of this application provides a terminal. The terminal may be an electronic device with a foldable-screen effect, such as a mobile phone, a tablet computer, or a notebook computer. The folding effect is mainly based on a rotating shaft and a damping mechanism. For example, the damping mechanism provided in this embodiment of this application is also applicable to a support device with a folding function. For example, a specific form of the foregoing electronic device or the support device is not specifically limited in this embodiment of this application. For ease of describing solutions of the damping mechanism, the following uses an example in which the terminal is a foldable screen phone for description.

For better description, a first direction is defined as an axial direction of a rotating shaft in the foldable screen phone (where a dashed-line area in which a serial number 13 in FIG. 1 is located is a location at which the rotating shaft may be disposed). A third direction is defined as a thickness direction of a foldable screen phone 1 in an unfolded state. A second direction is defined as a direction that is separately perpendicular to the first direction and the third direction, and may be understood as a length direction of the foldable screen phone shown in FIG. 1 in the unfolded state. In addition, for clearer description, a first center of rotation is set to be O3, a second center of rotation is set to be O2, and a third center of rotation is set to be O1. When an elastic member is directly disposed between a rotating shaft 13 and any housing (a first housing 11 or a second housing 12), the first center of rotation O3 may alternatively be understood as a center of rotation of the housing.

Referring to FIG. 1, the foldable screen phone 1 usually includes a housing and a flexible screen attached to an upper surface of the housing. The housing includes a first housing 11, a second housing 12, and a rotating shaft assembly configured to rotatably connect the first housing 11 and the second housing 12. In other words, the rotating shaft assembly is configured to implement folding rotation between the first housing 11 and the second housing 12. For example, the rotating shaft assembly usually includes a rotating shaft 13 located between the first housing 11 and the second housing 12, and a damping mechanism 2 that provides an unfolding force and/or a closing force for the rotating shaft 13. For example, the rotating shaft 13 may be directly or indirectly connected to the damping mechanism. Specifically, the damping mechanism can implement a hand feel of opening and closing in a process of folding and rotating between the first housing 11 and the second housing 12. In the conventional technology, to improve product competitiveness, a structure of a foldable machine becomes lighter and thinner, and in this case, space of the damping mechanism 2 becomes smaller. If an existing cam spring damping mechanism is still used, there is no enough space for mounting. When there is no damping mechanism, a problem of an insufficient unfolding force and closing force between the first housing 11 and the second housing 12 occurs.

To solve the foregoing problem, an auxiliary damping mechanism 2 is introduced in this solution to provide a corresponding unfolding force and closing force, so that a bending hand feel of the foldable machine meets a requirement. For example, the auxiliary damping mechanism 2 in this solution may also be used as a main damping mechanism 2 to provide a corresponding unfolding force and closing force.

To further adapt to requirements of foldable screen phones 1 with a plurality of structure sizes, a damping mechanism 2 for providing auxiliary torque acting on the outer side of the rotating shaft 13 is used as an example. That is, the damping mechanism 2 in this application is added on a basis of the existing cam spring damping mechanism. For the cam spring damping mechanism, reference may be made to the conventional technology. Details are not described herein. The following further describes a specific solution of the auxiliary damping mechanism in this application.

For example, referring to FIG. 1, the damping mechanism 2 in this application is configured to connect the rotating shaft 13 and two housings, that is, a rotatable connection between the first housing 11 and the second housing 12 is implemented by using the rotating shaft 13. The first housing 11 and the second housing 12 obtain, by using the damping mechanism 2, an unfolding force and/or a closing force required for opening and closing. The damping mechanism 2 is rotatably connected to the rotating shaft 13, so that the damping mechanism 2 drives opening and closing between the two housings. To further describe the solution clearly, the following further describes location and connection relationships between components with reference to FIG. 2 and FIG. 3.

Figure 2:
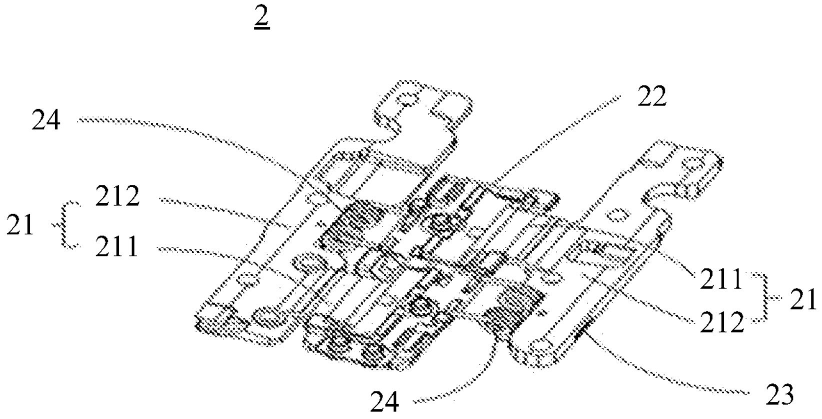
FIG. 2 is an example schematic diagram of a structure of a damping mechanism according to this application.
Figure 3:
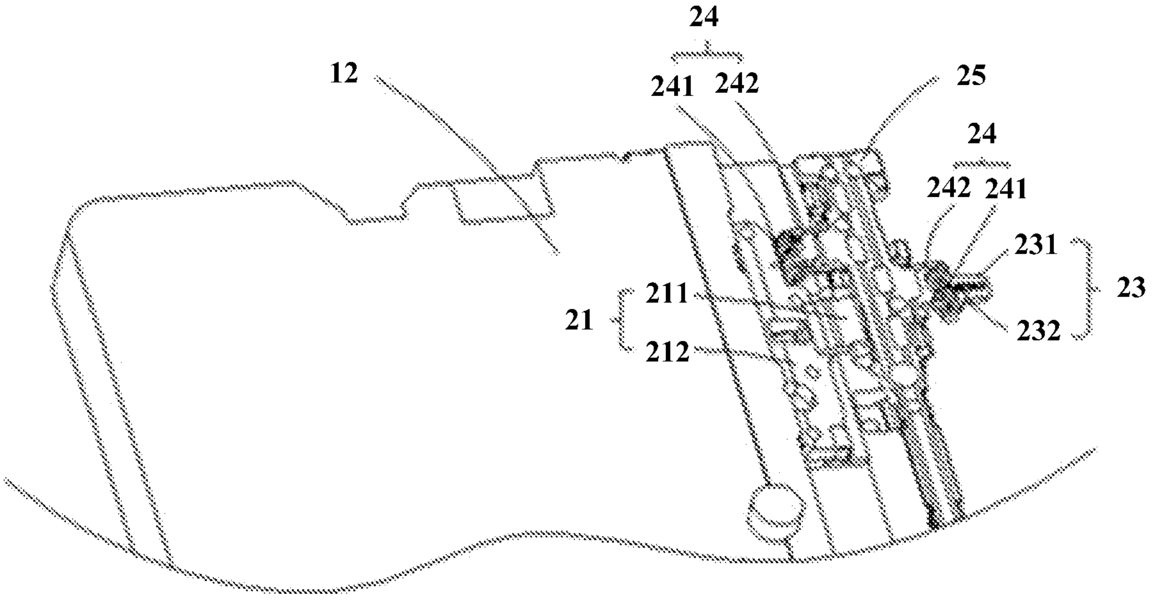
FIG. 3 is an example schematic diagram of a mounting structure of a damping mechanism according to this application.
Figure 4:
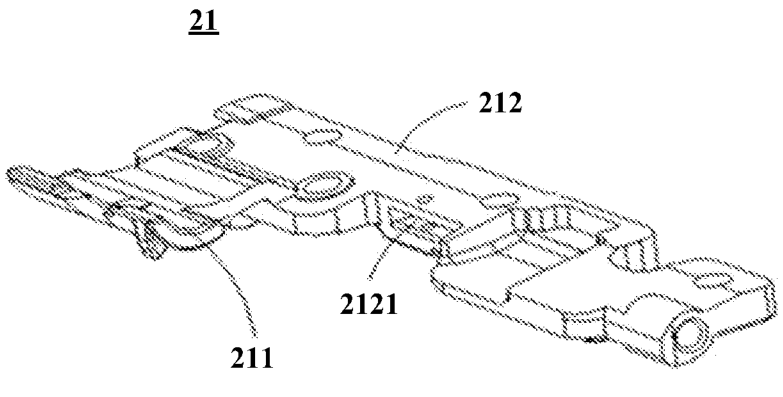
FIG. 4 is an example schematic diagram of a structure of a first swing arm according to this application.
Figure 5:
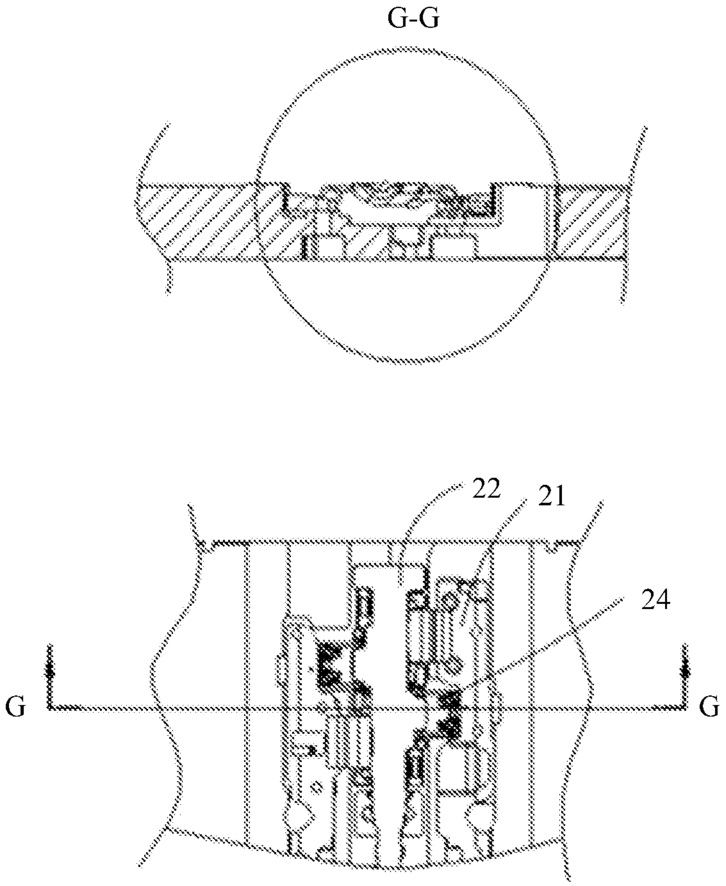
FIG. 5 is an example schematic diagram of a cross-sectional structure of a rotatable connection location between a first swing arm and a base according to this application.
Figure 6:
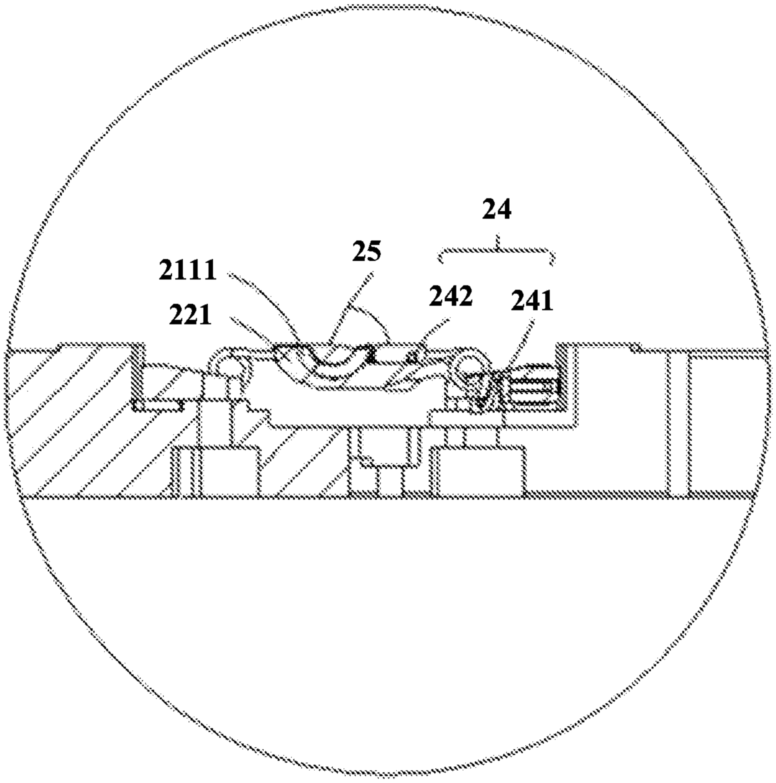
FIG. 6 is an example schematic diagram of enlargement of a rotation structure between a first swing arm and a base in FIG. 5 according to this application.

Referring to FIG. 2 and FIG. 3, the damping mechanism 2 in this solution may include a first swing arm 21 (namely, a first swinging member) and a base 22 (namely, a first fixing member). The first swing arm 21 may be fixedly connected to a housing on either side of the foldable screen phone 1, or the first swing arm 21 may be integrated with the housing on the either side. For example, the first swing arm 21 may be connected to the first housing 11 or the second housing 12. A connection between the first swing arm 21 and the first housing 11 or the second housing 12 may be a fixed connection, or may be a movable connection. This is not limited in this application. For example, the fixed connection in this solution may be a detachable fixed connection, or may be an undetachable fixed connection. This is not limited in this solution. Further, referring to FIG. 4, the first swing arm 21 includes a first fixing portion 211 and a first moving portion 212 connected to the first fixing portion 211. For example, a connection between the first fixing portion 211 and the first moving portion 212 in this solution includes a fixed connection, or may include a movable connection. This is not limited in this solution, provided that the first moving portion 212 can rotate following rotation of the first fixing portion 211. The first fixing portion 211 may be rotatably connected to the base 22, and the first moving portion 212 may drive the first housing 11 to rotate relative to the second housing 12, or the first moving portion 212 may drive the second housing 12 to rotate relative to the first housing 11. Referring to FIG. 5 and FIG. 6, for example, the first fixing portion 211 may include a protruding sliding rail sub-portion 2111, and the base 22 may include a sliding groove sub-portion 221. The protruding sliding rail sub-portion 2111 can slidably rotate relative to the sliding groove sub-portion 221, so that when a location of the base 22 is unchanged, the first swing arm 21 can drive, in a process of rotating relative to the base 22, opening and closing of a housing on either side relative to a housing on the other side. For example, the first fixing portion 211 may alternatively include a protruding sliding rail sub-portion 2111 that protrudes downward in the third direction, and a sliding groove sub-portion 221 adapted to the protruding sliding rail sub-portion 2111 is disposed on the base 22; and the sliding groove sub-portion 221 is located below the protruding sliding rail sub-portion 2111, is fixedly disposed relative to the protruding sliding rail sub-portion 2111 in the third direction and the second direction, and is rotatably connected to the protruding sliding rail sub-portion 2111 in the first direction. For example, the first fixing portion 211 alternatively includes a protruding sliding rail sub-portion 2111 that protrudes upward in the third direction, and a sliding groove sub-portion 221 adapted to the protruding sliding rail sub-portion 2111 is disposed on the base 22; and the sliding groove sub-portion 221 is located above a protruding portion, is fixedly disposed relative to the protruding sliding rail sub-portion 2111 in the third direction and the second direction, and is rotatably connected to the protruding sliding rail sub-portion 2111 in the first direction. For example, the first fixing portion 211 includes a protruding sliding rail sub-portion 2111 that protrudes upward in the third direction, and a sliding groove sub-portion 221 adapted to the protruding sliding rail sub-portion 2111 is disposed on the base 22; and the sliding groove sub-portion 221 is located below the protruding sliding rail sub-portion 2111, is fixedly disposed relative to the protruding sliding rail sub-portion 2111 in the third direction and the second direction, and is rotatably connected to the protruding sliding rail sub-portion 2111 in the first direction. In conclusion, the protruding sliding rail sub-portion 2111 and the sliding groove sub-portion 221 together form the first center of rotation O3 between the base 22 and the first swing arm 21.

For example, the base 22 in this application may be a detachable structure, and the base 22 is a structure separated from the two housings, as described in the foregoing solution. Alternatively, for example, the base 22 in this application may be a structure integrated with a housing on a corresponding side. For example, when the base 22 and the first housing 11 are an integral structure, the first housing 11 may include a first portion and a second portion, the first portion is rotatably connected to the first fixing portion 211, and the first moving portion 212 drives the second portion to move accordingly.

In conclusion, regardless of whether the base 22 and the housing on either side are an integral structure, the first moving portion 212 on the first swing arm 21 can drive the first housing 11 to move accordingly.

Figure 7:
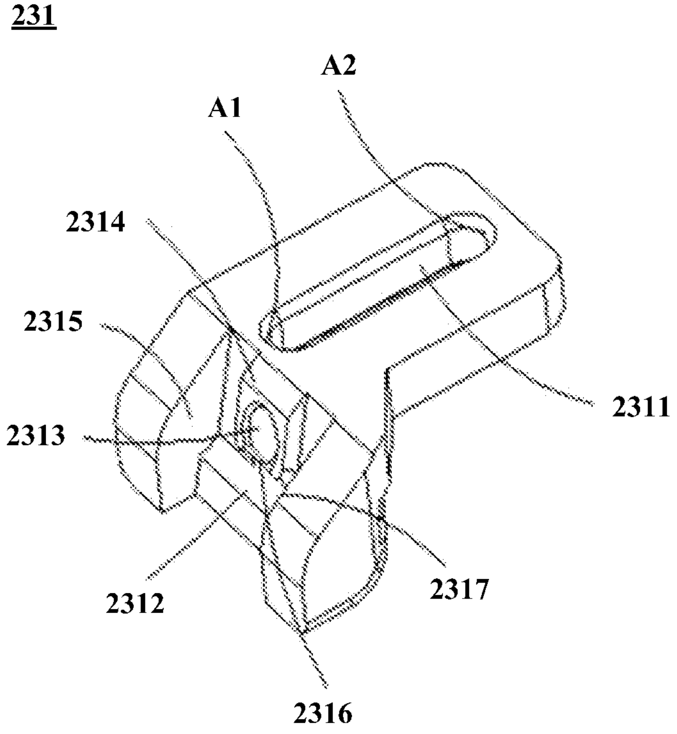
FIG. 7 is an example schematic diagram of a structure of a first slider according to this application.
Figure 8:
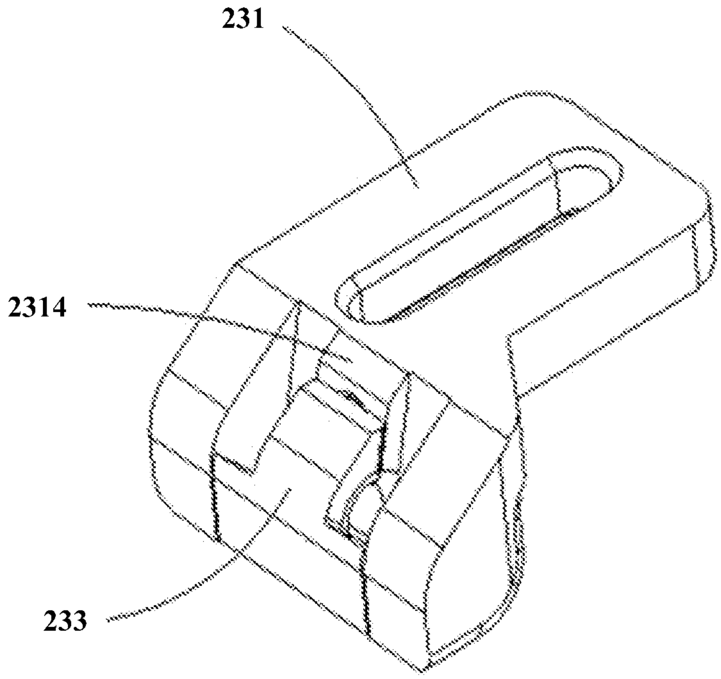
FIG. 8 is an example schematic diagram of a mounting structure of a first slider and a locking member according to this application.
Figure 9:
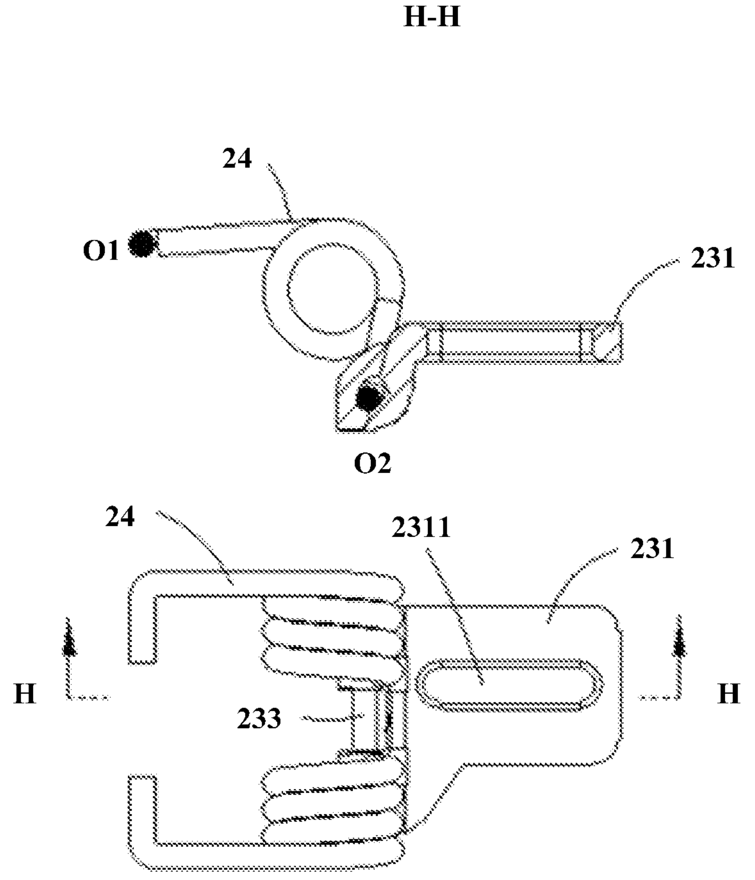
FIG. 9 is an example schematic diagram of a cross-sectional structure of a connection location among a first slider, a locking member, and a torsion spring according to this application.

The damping mechanism 2 in this application may further include a limiting slider assembly 23. Further referring to FIG. 7, FIG. 8, and FIG. 9, for example, the limiting slider assembly 23 is disposed in the first moving portion 212. During mutual opening between the two housings, the elastic member (a torsion spring 24 or a spring) drives the limiting slider assembly 23 to slide in the first moving portion 212 of the first swing arm 21, to further improve a service life of the elastic member (the torsion spring 24 or the spring). The limiting slider assembly 23 includes a first slider 231 provided with a first sliding groove 2311 and a limiting member 232 that can move in the second direction in the first sliding groove 2311. An extension length of the first sliding groove 2311 in the second direction is a movement stroke of following movement of the first moving portion 212 relative to the first housing 11. Specifically, an accommodating groove 2121 used to accommodate the first slider 231 is disposed extending in the second direction on a side surface of the first moving portion 212. For example, the accommodating groove 2121 may be engaged with and abut against the first slider 231. For example, a structure size of the accommodating groove 2121 in this application is adapted to a structure size of the first slider 231, provided that displacement of the first slider 231 in the first direction and the third direction can be limited. In addition, the accommodating groove 2121 includes an opening in the second direction, and the first slider 231 can move along the opening in the second direction. Specifically, the limiting member 232 may include, in the third direction, a first end located on a top surface and a second end away from the first end. For example, the first end may pass through the first sliding groove 2311 in the third direction, and be fixedly connected to the first moving portion 212. Alternatively, the first end may pass through the first sliding groove 2311, and the second end may be fixedly connected to the first housing 11. A fixed connection form between the second end and the first housing 11 is not limited in this application, provided that a fixed connection between the second end and the first housing 11 can be implemented. It should be noted that a structure of the limiting member 232 should be adapted to a structure of the first sliding groove 2311 of the first slider 231. Further referring to FIG. 7, for example, the first sliding groove 2311 includes a closed annular surface, the annular surface includes a first point A1 and a second point A2 disposed farthest from the first point A1, and the limiting member 232 can move between the first point A1 and the second point A2. For example, it is assumed that the second housing 12 is in a still state, the first housing 11 rotates relative to the second housing 12, and the foldable screen phone changes from an unfolded state to an intermediate state. In this case, the limiting member 232 abuts against the first point A1 at a near end, that is, an interaction force is generated between the limiting member 232 and the first slider 231. For example, it is assumed that the second housing 12 is in a still state, the first housing 11 rotates relative to the second housing 12, and the foldable screen phone is at a preset angle in an intermediate state. For example, an included angle between the first housing and the second housing may be 90°. In this case, the limiting member 232 may be in contact with or separated from the first point A1 at a near end, that is, there is no interaction force between the limiting member 232 and the first slider 231. For example, assuming that the second housing 12 is in a still state, and when the first housing 11 rotates relative to the second housing 12, and the foldable screen phone changes from an intermediate state to a folded state, for example, an included angle between the first housing 11 and the second housing 12 changes from 90° to 0°, the limiting member 232 can move from the first point A1 at a near end to the second point A2 at a far end. For example, it is assumed that the second housing 12 is in a still state, the first housing 11 rotates relative to the second housing 12, and the foldable screen phone is in a folded state. For example, an included angle between the first housing 11 and the second housing 12 may be 0°. In this case, the limiting member 232 can move between the first point A1 and the second point A2, or the limiting member 232 can move to the second point A2.

Further, referring to FIG. 9, FIG. 10, FIG. 11, and FIG. 12, the damping mechanism 2 in this application should further include the elastic member providing a damping force. For example, the elastic member may be the torsion spring 24, or may be the spring. For example, the torsion spring 24 may include a first pin 241 and a second pin 242 that are configured to form a torsion angle. For example, the first pin 241 is configured to rotatably connect to the first slider 231 and moves with sliding of the first slider 231 in the accommodating groove 2121 in the second direction. Specifically, a first hole (not shown in the figure) is provided on the first slider 231 in an axial direction of the rotating shaft 13, and the first pin 241 and the first hole can implement shaft-hole cooperative rotation. For example, the second pin 242 is configured to rotatably connect to the base 22. Specifically, a second hole is provided on the base 22 in an axial direction of the rotating shaft 13, and the second pin 242 and the second hole can implement shaft-hole cooperative rotation. For example, a clamping groove 2312 is provided on a surface of the first slider 231 in contact with the torsion spring 24, and the clamping groove 2312 is used to limit a mounting location of a center of rotation of the first pin 241. Further, referring to FIG. 8, the clamping groove 2312 includes a first inner side wall 2315, an inner top surface 2316, and a second inner side wall 2317 that are smoothly connected to each other, the inner top surface 2316 is used to limit displacement of the first pin 241 in the third direction, and the first inner side wall 2315 and the second inner side wall 2317 are used to limit displacement of the first pin 241 in the first direction. In addition, the limiting slider assembly further includes a locking member, a locking boss 2314 is disposed on the surface of the first slider 231 in contact with the torsion spring 24, and a locking hole 2313 adapted to the locking member is provided on the locking boss 2314 in the second direction, the locking boss 2314 is located above the inner top surface 2316, and a lower edge surface of the locking boss 2314, the inner top surface 2316, and the locking member together form to limit displacement of the first pin 241 in the second direction.

Specifically, the clamping groove 2312 is disposed on a side of the first slider 231 on which the torsion spring 24 is mounted. The first pin 241 or the second pin 242 in the torsion spring 24 may be clamped to the clamping groove 2312. The locking hole 2313 is further disposed above the clamping groove 2312. In addition, a locking member 233 is further included, and the locking member 233 is fixed to the locking hole 2313 through shaft hole cooperation, so that the locking member 233 and the clamping groove 2312 can together limit offset of the first pin 241 or the second pin 242 in the torsion spring 24 in a rotation process.

Alternatively, for example, the damping mechanism 2 in this application may further include a cover plate 25, and the cover plate 25 plays a fixing role. For example, the first fixing member may include the cover plate 25 and the base 22. Specifically, a long groove hole (namely, a mounting hole) is provided at a location on the cover plate 25 corresponding to the second pin 242, and the second pin 242 matches a structure size of the long groove hole. In addition, a protection structure is disposed at a location on the cover plate 25 corresponding to the first fixing portion 211. Referring to FIG. 6, when the first fixing portion 211 is a convex surface, the protection structure on the cover plate 25 is a concave shield body adapted to the convex surface, or when the first fixing portion 211 is a groove surface, the protection structure on the cover plate 25 is a convex shield body adapted to the groove surface. For example, a quantity of protection structures on the cover plate 25 corresponds to a quantity of first swing arms 21, and a quantity of first swing arms 21 corresponds to a quantity of torsion springs 24. The damping mechanism 2 in this application may include one torsion spring 24, two torsion springs 24, or a plurality of torsion springs 24. This is not limited in this application. On a foldable display terminal, a quantity of damping mechanisms 2 in this application may include one, two, or more. This is not limited in this application. In addition, the torsion spring 24 in this application may be a one-segment, two-segment, or multiple-segment spring structure. This is still not limited in this application.

It should be noted that the cover plate 25 and the base 22 in this application may be independent structures, or the cover plate 25 and the base 22 in this application may be an integral structure. For a specific structure, refer to the foregoing solution. This is not limited herein.

Specifically, a connection form of the torsion spring 24 is not limited in this application, provided that the torsion spring 24 can have a damping effect on the rotating shaft and provide an unfolding force and a folding force. In addition, a quantity of torsion springs 24 is not limited in this application, and may be set according to an actual use requirement. In addition, the rotatable connection mentioned in this application may be implemented by using a perforated structure or a shaft-hole cooperative structure. A form of the rotatable connection is not limited in this application, provided that the swing arm can rotate and a pin connection of the torsion spring 24 can be rotated. In addition, for example, a fixed location of the torsion spring 24 in this application is not limited to the base 22 and the first swing arm 21, or may be another location, provided that a pressure and an angle can be provided, so that the swing arm can generate a force for unfolding and folding.

Alternatively, for example, three or more damping mechanisms 2 may be disposed on the foldable screen phone 1, and pin arrangement manners of torsion springs 24 of the damping mechanisms 2 are combined arbitrarily. This is not limited in this application.

For example, the limiting member 232 may be a dowel pin. The dowel pin can cooperate with the first sliding groove 2311 to play a limiting role. For a specific solution, refer to the foregoing structure.

A rotation angle between the first housing 11 and the second housing 12 may be set according to an actual requirement. Therefore, to better exert a force of the torsion spring 24, the first sliding groove 2311 is provided on the first slider 231. The limiting member 232 is fixedly connected to the first housing 11, the first swing arm 21 can rotate relative to the base 22, and the first swing arm 21 is connected to the base 22 by using the first slider 231 and the torsion spring 24. Therefore, when the first housing 11 rotates relative to the base 22 following the first swing arm 21, the limiting member 232 fixed to the first housing 11 can relatively move in the first sliding groove 2311. When the first housing 11 rotates to a preset angle, the torsion spring 24 is in a free state. When the first housing 11 rotates, due to existence of the first sliding groove 2311, the torsion spring 24 in a free state enables the limiting member 232 to move between the first point A1 and the second point A2. That is, a side wall of the first sliding groove 2311 does not squeeze the limiting member 232. Correspondingly, the limiting member 232 does not exert force on the first sliding groove 2311, so that when the first housing 11 rotates between some angles, the torsion spring 24 is always in the free state. Therefore, the torsion spring 24 is not always pulled, thereby increasing a service life of the torsion spring 24.

It may be understood that a distance between the first point A1 and the second point A2 in the second direction may be changed. A distance of a stroke of the torsion spring 24 is controlled by changing the distance between the first point A1 and the second point A2 (namely, a length of the first sliding groove 2311), to determine a magnitude of an unfolding force or a closing force.

With reference to the foregoing structure, the following describes working principles of the foldable screen phone 1 in different use statuses.

It should be noted that the following angles are merely example descriptions, and do not constitute a limitation on this application.

Figure 10:
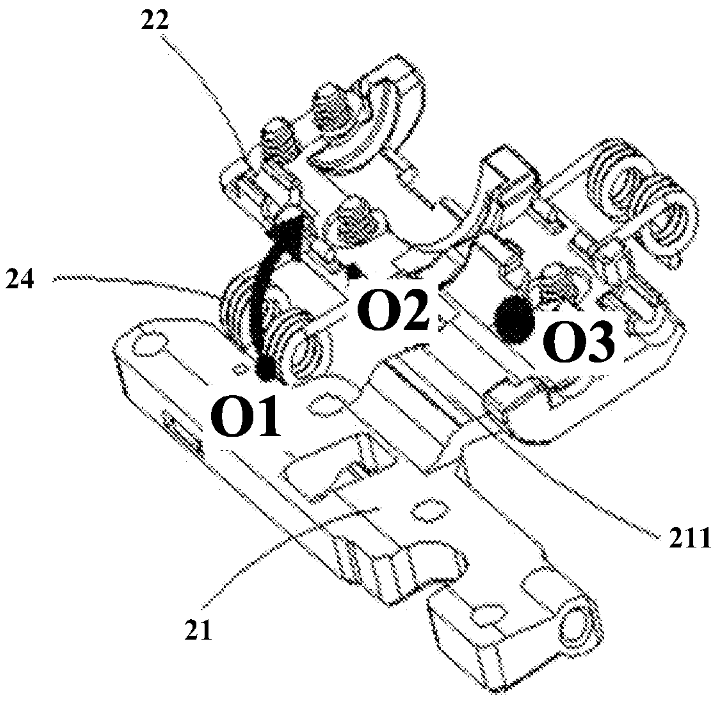
FIG. 10 is an example schematic diagram of an unfolded state of a damping mechanism and a schematic diagram of locations of centers of rotation between a torsion spring, a first swing arm, and a base according to this application.
Figure 11:
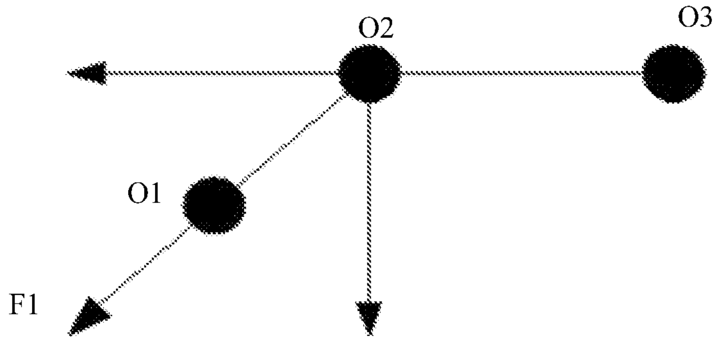
FIG. 11 is a diagram of projections and forces of a first center of rotation, a second center of rotation, and a third center of rotation relative to a vertical plane of a first direction when a foldable screen phone is in an unfolded state.

Referring to FIG. 10 and FIG. 11, when the foldable screen phone 1 is in an unfolded state, for example, when an included angle between the first housing 11 and the second housing 12 is 180°, a center of rotation of the first swing arm 21 relative to the base 22 is O3, a center of rotation between the first swing arm 21 and the torsion spring 24 is O1, a center of rotation between the torsion spring 24 and the base 22 is O2, and a plane perpendicular to the first direction is set as a projection reference plane (also referred to as a reference plane). In the unfolded state, a vertical projection point of O1 on the projection reference plane is located below a connection line between vertical projection points of O2 and O3 on the projection reference plane. In addition, a pull force F1 of the torsion spring 24 is formed between O1 and O2. A component force of the pull force F1 relative to the connection line between the projection points of O2 and O3 has a downward direction, that is, the force of the torsion spring 24 drives the first swing arm 21 to have a downward (unfolding) component force. Therefore, the first swing arm 21 has a downward (unfolding) movement trend, to form an unfolding force. The first swing arm 21 drives a housing (the first housing 11 or the second housing 12) connected to the first swing arm 21 to perform unfolding movement.

Figure 12:
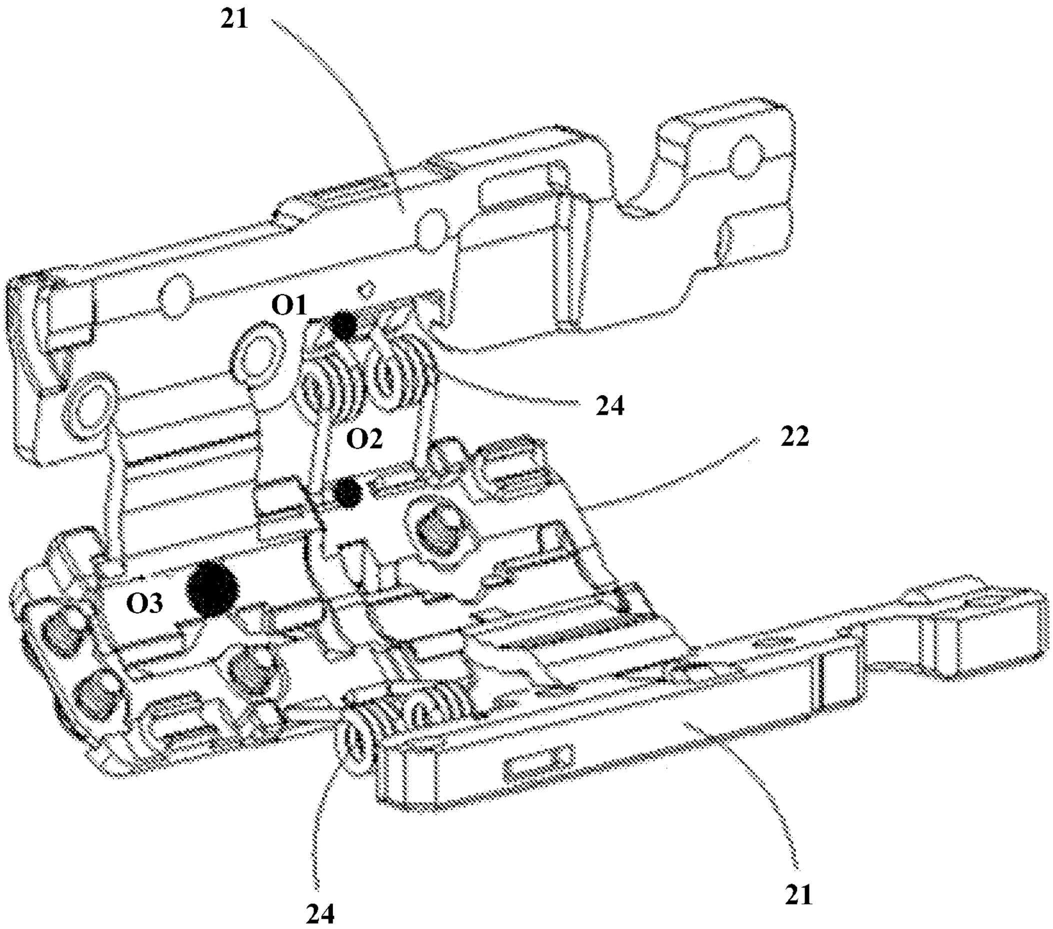
FIG. 12 is an example schematic diagram of an intermediate state of a damping mechanism and a schematic diagram of locations of centers of rotation between a torsion spring, a first swing arm, and a base according to this application.
Figure 13:
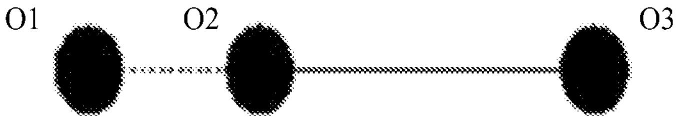
FIG. 13 is a diagram of projections and forces of a first center of rotation, a second center of rotation, and a third center of rotation relative to a vertical plane of a first direction when a foldable screen phone is in an intermediate state.

Referring to FIG. 12 and FIG. 13, when the foldable screen phone 1 is in an intermediate state, for example, a 160° included angle is formed between the first housing 11 and the second housing 12, when the first swing arm 21 continues to rotate upward (in a closing direction) from an unfolding state, the torsion spring 24 continues to be compressed, a center of rotation between the torsion spring 24 and the base 22 is O2, a center of rotation between the torsion spring 24 and the first swing arm 21 is O1, a center of rotation between the first swing arm 21 and the base 22 is O3, and a plane perpendicular to the first direction is set as a projection reference plane. In the intermediate state, vertical projection points of O1, O2, and O3 relative to the projection reference plane fall on a same straight line. Therefore, a torsion force of the torsion spring produces no upward or downward force relative to the first swing arm 21, that is, the torsion spring 24 has no downward (unfolding) or upward (closing) component force for driving the first swing arm 21. Therefore, the first swing arm 21 is in a dead center state, and there is no unfolding force or closing force.

Figure 14:
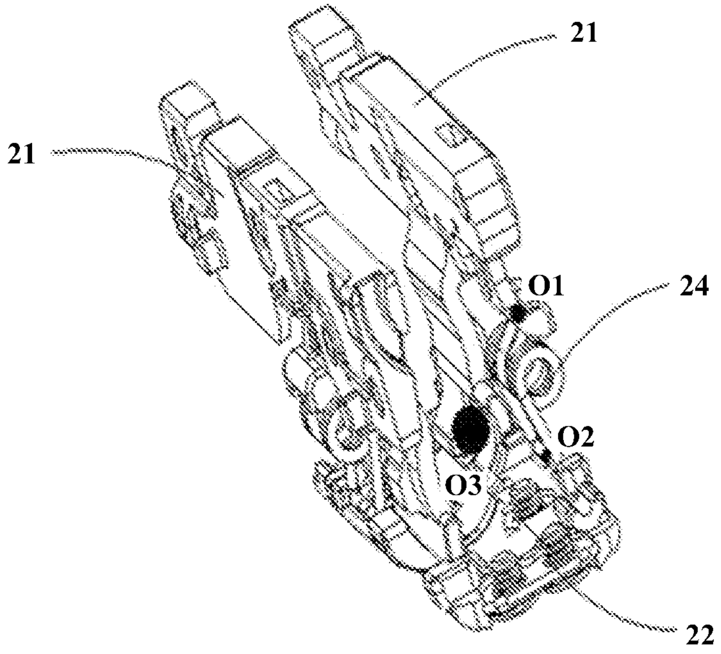
FIG. 14 is an example schematic diagram of a folded state of a damping mechanism and a schematic diagram of locations of centers of rotation between a torsion spring, a second swing arm, and a base according to this application.
Figure 15:
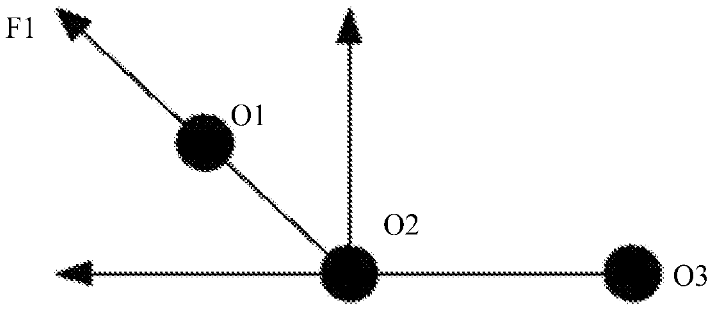
FIG. 15 is a diagram of projections and forces of a first center of rotation, a second center of rotation, and a third center of rotation relative to a vertical plane of a first direction when a foldable screen phone is in a folded state (a closed state).

Further, referring to FIG. 14 and FIG. 15, when the first swing arm 21 continues to move relative to the second housing 12, a plane perpendicular to the first direction is set as a projection reference plane. In this case, a vertical projection point of O1 on the projection reference plane is located above a line connecting vertical projection points of O2 and O3 on the projection reference plane. A force between O1 and O2 has an upward pull force relative to O3, that is, a pressure of the torsion spring 24 drives the first swing arm 21 to have an upward (closing) component force. Therefore, the first swing arm 21 has an upward (closing) movement trend, so that there is a closing force. The first swing arm 21 drives a connected housing (the first housing 11 or the second housing 12) to perform closing movement.

When the foldable screen phone 1 switches from the intermediate state to the closed state, for example, in a process in which an included angle between the first housing 11 and the second housing 12 ranges from 90° to 0°, the first swing arm 21 continues to move upward, and when a pressure of the torsion spring 24 returns to a free state as an upward moving distance increases, no pressure is provided. Therefore, there is no upward (closing) or downward (unfolding) component force, and there is no unfolding force or closing force, protecting a stroke of the torsion spring 24 from being overloaded.

It should be noted that a center of rotation in which the first fixing member is rotatably connected to the first fixing portion 211 is the first center of rotation O3, a center of rotation in which the second pin 242 is rotatably connected to the first fixing member is the second center of rotation O2, and a projection of the first center of rotation O3 on the reference plane does not overlap a projection of the second center of rotation O2 on the reference plane. The reference plane is a plane perpendicular to the first direction. The reference plane is the foregoing projection reference plane. It is assumed that vertical projections of the two centers of rotation relative to the projection reference plane do not overlap, which can implement changing of an unfolding force or a closing force relative to the housing in a rotation process of the torsion spring (the spring).

When being required from the intermediate state to the closed state, a closing force or a specific range of closing forces may be implemented by using the first slider 231 and the dowel pin. That is, a force process from the unfolded state to the intermediate state is the same as the foregoing descriptions. Details are not described herein again. When the intermediate state changes to the folded state, because the first sliding groove 2311 is provided in the middle of the first slider 231, the dowel pin passes through the first sliding groove 2311 of the first slider 231, and two upper and lower ends of the dowel pin are fixed to the first swing arm 21, or two upper and lower ends of the dowel pin are fixed to the first housing 11. When the first slider 231 slides, a relative movement occurs between the dowel pin located in the first sliding groove 2311 and the first sliding groove 2311. Because the first sliding groove 2311 has a closed annular surface, when the dowel pin is in contact with the first point A1 and the second point A2, the relative displacement between the dowel pin and the first sliding groove 2311 does not continue to move. In this way, the first slider 231 can be limited by the dowel pin. A stroke distance of the torsion spring 24 is controlled by adjusting a grooving length of the first slider 231 to determine a magnitude and an angle of an unfolding force or a closing force.

In conclusion, in this application, the structure of the torsion spring 24 is used, and the torsion spring 24 is disposed on a structure outside the shaft, so that no space inside the shaft is occupied. When the foldable machine is designed to be lighter and thinner, and a damping system cannot implement an enough unfolding force due to small space, a corresponding unfolding force and closing force are provided by the main damping mechanism 2 or the auxiliary damping mechanism 2, so that a bending hand feel of the foldable machine meets a requirement.

For example, if the damping mechanism 2 in this application is used as the main damping mechanism 2 of the rotating shaft, a plurality of damping mechanisms 2 in this application may be disposed, and the plurality of damping mechanisms 2 may be disposed in a plurality of locations on the outer side of the shaft. For a specific arrangement manner, refer to the foregoing solution.

The embodiments of this application are described with reference to the accompanying drawings. However, this application is not limited to the foregoing specific implementations. The foregoing specific implementations are merely examples, but are not restrictive. Many forms made by a person of ordinary skill in the art under inspiration of this application and without departing from the objectives and the protection scope of the claims of this application shall fall within the protection scope of this application.

What is claimed is:

1. A damping mechanism, comprising:

an elastic member, wherein the elastic member comprises a first pin and a second pin;

a first fixing member, wherein the first fixing member is rotatably connected to the second pin in a first direction; and a first swinging member, wherein the first swinging member comprises a first fixing portion and a first moving portion, and the first fixing portion is rotatably connected to the first fixing member in the first direction, and the first moving portion is rotatably connected to the first pin in the first direction; and wherein when rotation is performed between the first fixing member and the first swinging member, an elastic force generated by the elastic member acts on a center of rotation in which the first moving portion is rotatably connected to the first pin, forming an unfolding force or a closing force; and wherein the damping mechanism further comprises a limiting slider assembly, and an accommodating groove used to accommodate the limiting slider assembly extends in a side surface of the first swinging member in a second direction;

wherein the first pin is rotatably connected to the limiting slider assembly in the first direction;

wherein the limiting slider assembly is slidably connected to the accommodating groove in the second direction, to drive the first pin to move in the second direction; and wherein the second direction is perpendicular to the first direction.

2. The damping mechanism according to claim 1, wherein a center of rotation in which the first fixing member is rotatably connected to the first fixing portion is a first center of rotation, and a center of rotation in which the second pin is rotatably connected to the first fixing member is a second center of rotation;

a projection of the first center of rotation on a reference plane does not overlap a projection of the second center of rotation on the reference plane; and the reference plane is a plane perpendicular to the first direction.

3. The damping mechanism according to claim 2, wherein the center of rotation in which the first pin is rotatably connected to the first moving portion is a third center of rotation; and wherein:

when the first fixing member and the first swinging member are at a first preset included angle, and a projection of the third center of rotation on the reference plane is located on an extended line connecting the projection of the first center of rotation on the reference plane and the projection of the second center of rotation on the reference plane, there is no unfolding force or closing force on the third center of rotation.

4. The damping mechanism according to claim 1, wherein the limiting slider assembly comprises a first slider with a first sliding groove and a limiting member that relatively moves in the second direction in the first sliding groove, the limiting member is capable of passing through the accommodating groove and being fixed to the first swinging member, and the first sliding groove is defined by a closed annular surface, the closed annular surface comprises, in the second direction, a first point and a second point disposed farthest from the first point, and the limiting member moves between the first point and the second point; and wherein:

when an included angle between the first swinging member and the first fixing member is a third preset included angle, the limiting member abuts against the first point;

when the included angle between the first swinging member and the first fixing member changes from the third preset included angle to a fourth preset included angle, the limiting member moves from the first point to the second point; or when the included angle between the first swinging member and the first fixing member is the fourth preset included angle, the limiting member is in contact with or separated from the second point.

5. The damping mechanism according to claim 4, wherein a clamping groove extends in a surface of the first slider in contact with the elastic member, and the clamping groove limits a mounting location of a center of rotation of the first pin.

6. The damping mechanism according to claim 5, wherein the clamping groove is defined by a first inner side wall, an inner top surface, and a second inner side wall that are smoothly connected to each other, the inner top surface limits displacement of the first pin in a third direction, and the first inner side wall and the second inner side wall limit displacement of the first pin in the first direction.

7. The damping mechanism according to claim 6, wherein the limiting slider assembly further comprises a locking member, a locking boss is disposed on the surface of the first slider in contact with the elastic member, a locking hole adapted to the locking member extends in the locking boss in the second direction, the locking boss is located above the inner top surface, and a lower edge surface of the locking boss, the inner top surface, and the locking member all are configured to limit displacement of the first pin in the second direction.

8. The damping mechanism according to claim 1, wherein the first fixing portion comprises a protruding sliding rail sub-portion that protrudes downward in a third direction, and a sliding groove portion adapted to the protruding sliding rail sub-portion extends in the first fixing member; and wherein the sliding groove portion is located below the protruding sliding rail sub-portion, is fixedly disposed relative to the protruding sliding rail sub-portion in the second direction and the third direction, and is rotatably connected to the protruding sliding rail sub-portion in the first direction.

9. The damping mechanism according to claim 1, wherein the first fixing portion comprises a protruding sliding rail sub-portion that protrudes downward in a third direction, and a sliding groove portion adapted to the protruding sliding rail sub-portion extends in the first fixing member; and wherein the sliding groove portion is located above the protruding sliding rail sub-portion, is fixedly disposed relative to the protruding sliding rail sub-portion in the second direction and the third direction, and is rotatably connected to the protruding sliding rail sub-portion in the first direction.

10. The damping mechanism according to claim 1, wherein the first fixing portion comprises a protruding sliding rail sub-portion that protrudes upward in a third direction, and a sliding groove portion adapted to the protruding sliding rail sub-portion extends in the first fixing member; and wherein the sliding groove portion is located above the protruding sliding rail sub-portion, is fixedly disposed relative to the protruding sliding rail sub-portion in the second direction and the third direction, and is rotatably connected to the protruding sliding rail sub-portion in the first direction.

11. The damping mechanism according to claim 1, wherein the first fixing portion comprises a protruding sliding rail sub-portion that protrudes upward in a third direction, and a sliding groove portion adapted to the protruding sliding rail sub-portion extends in the first fixing member; and wherein the sliding groove portion is located below the protruding sliding rail sub-portion, is fixedly disposed relative to the protruding sliding rail sub-portion in the second direction and the third direction, and is rotatably connected to the protruding sliding rail sub-portion in the first direction.

12. The damping mechanism according to claim 8, wherein the first fixing member comprises a base and a cover plate, the cover plate is located above the base, the second pin, and the first fixing portion, and the cover plate is fixedly connected to the base;

the base comprises the sliding groove portion; and a mounting hole extends in an edge of the cover plate in the first direction, and the second pin is rotatably connected to the mounting hole.

13. The damping mechanism according to claim 8, wherein the first fixing member comprises a base, the base comprises the sliding groove portion, a mounting hole extends in an edge of the base in the first direction, and the second pin is rotatably connected to the mounting hole.

14. The damping mechanism according to claim 1, wherein the elastic member further comprises a torsion spring or a spring.

15. A terminal, comprising a damping mechanism comprising:

an elastic member, wherein the elastic member comprises a first pin and a second pin;

a base, wherein the base is rotatably connected to the second pin in a first direction; and a first swing arm, wherein the first swing arm comprises a first fixing portion and a first moving portion, and the first fixing portion is rotatably connected to the base in the first direction, and the first moving portion is rotatably connected to the first pin in the first direction; and wherein the damping mechanism is configured in a manner that, when rotation is performed between the base and the first swing arm, an elastic force generated by the elastic member acts on a center of rotation in which the first moving portion is rotatably connected to the first pin, forming an unfolding force or a closing force; and wherein the damping mechanism further comprises a limiting slider assembly, and an accommodating groove used to accommodate the limiting slider assembly extends in a side surface of the first swing arm in a second direction;

wherein the first pin is rotatably connected to the limiting slider assembly in the first direction;

wherein the limiting slider assembly is slidably connected to the accommodating groove in the second direction, to drive the first pin to move in the second direction; and wherein the second direction is perpendicular to the first direction.

16. The terminal according to claim 15, further comprising a first housing, a second housing, and a rotating shaft assembly located between the first housing and the second housing, wherein the damping mechanism is located on an outer side of the rotating shaft assembly;

wherein the first swing arm is connected to the first housing, or the first swing arm is connected to the second housing; and wherein the base is located between the first housing and the second housing; or the base is integrated with the first housing; or the base is integrated with the second housing.

17. A damping mechanism, comprising:

an elastic member, wherein the elastic member comprises a first pin and a second pin;

a first fixing member, wherein the first fixing member is rotatably connected to the second pin in a first direction; and a first swinging member, wherein the first swinging member comprises a first fixing portion and a first moving portion, and the first fixing portion is rotatably connected to the first fixing member in the first direction; the first moving portion is rotatably connected to the first pin in the first direction and wherein:

when rotation is performed between the first fixing member and the first swinging member, an elastic force generated by the elastic member acts on a center of rotation in which the first moving portion is rotatably connected to the first pin, forming an unfolding force or a closing force;

a center of rotation in which the first fixing member is rotatably connected to the first fixing portion is a first center of rotation, and a center of rotation in which the second pin is rotatably connected to the first fixing member is a second center of rotation;

a projection of the first center of rotation on a reference plane does not overlap a projection of the second center of rotation on the reference plane; and the reference plane is a plane perpendicular to the first direction.

18. The damping mechanism according to claim 17, wherein the center of rotation in which the first pin is rotatably connected to the first moving portion is a third center of rotation; and when the first fixing member and the first swinging member are at a first preset included angle, and a projection of the third center of rotation on the reference plane is located on an extended line connecting the projection of the first center of rotation on the reference plane and the projection of the second center of rotation on the reference plane, there is no unfolding force or closing force on the third center of rotation; or when the first fixing member and the first swinging member are at a second preset angle, the third center of rotation is not located on the extended line connecting the projection of the first center of rotation on the reference plane and the projection of the second center of rotation on the reference plane, to form an unfolding force or a closing force acting on the third center of rotation.

19. The damping mechanism according to claim 17, wherein the damping mechanism further comprises a limiting slider assembly, and an accommodating groove used to accommodate the limiting slider assembly extends in a side surface of the first swinging member in a second direction;

the first pin is rotatably connected to the limiting slider assembly in the first direction;

the limiting slider assembly is slidably connected to the accommodating groove in the second direction, to drive the first pin to move in the second direction; and the second direction is perpendicular to the first direction.

20. The damping mechanism according to claim 3, wherein:

when the first fixing member and the first swinging member are at the second preset angle, the third center of rotation is not located on the extended line connecting the projection of the first center of rotation on the reference plane and the projection of the second center of rotation on the reference plane, to form an unfolding force or a closing force acting on the third center of rotation.

* * * * *